United States Patent
Wang et al.

(10) Patent No.: US 7,995,680 B2
(45) Date of Patent: Aug. 9, 2011

(54) APPARATUS AND METHOD FOR PREAMBLE DETECTION AND INTEGER CARRIER FREQUENCY OFFSET ESTIMATION

(75) Inventors: Xin Wang, Beijing (CN); Yuuta Nakaya, Kawasaki (JP); Syuusaku Suzuki, Yokohama (JP); Michiharu Nakamura, Kawasaki (JP); Hiroyuki Hayashi, Beijing (CN)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 12/044,120

(22) Filed: Mar. 7, 2008

(65) Prior Publication Data

US 2008/0232513 A1  Sep. 25, 2008

(30) Foreign Application Priority Data

Mar. 20, 2007  (CN) .......................... 2007 1 0089131

(51) Int. Cl.
*H04L 27/06* (2006.01)
(52) U.S. Cl. ...................................................... 375/340
(58) Field of Classification Search .................. 375/340
See application file for complete search history.

(56) References Cited

U.S. PATENT DOCUMENTS

| 7,263,133 B1* | 8/2007 | Miao | 375/267 |
| 2005/0185743 A1* | 8/2005 | Li | 375/350 |
| 2006/0034227 A1* | 2/2006 | Mudulodu et al. | 370/334 |
| 2006/0133321 A1* | 6/2006 | Lim et al. | 370/331 |
| 2007/0217552 A1* | 9/2007 | Lee et al. | 375/343 |
| 2007/0280098 A1* | 12/2007 | Bhatt et al. | 370/208 |

* cited by examiner

*Primary Examiner* — Shuwang Liu
*Assistant Examiner* — Michael Neff
(74) *Attorney, Agent, or Firm* — Katten Muchin Rosenman LLP

(57) ABSTRACT

This invention provides an apparatus and method for preamble detection and integer carrier frequency offset estimation, which method comprises the steps of: determining the window of useful subcarriers in preamble transformed to frequency domain based on pre-determined possible integer carrier frequency offset and the length of the preamble, so as to select the useful subcarriers; extracting a plurality of subcarrier sequences having a length equal to that of the preamble from the useful subcarriers; calculating conjugative multiplications of each subcarrier and its neighboring subcarriers in the subcarrier sequences extracted; acquiring the real part of the conjugative multiplications; calculating the cross correlations between the real part of the conjugative multiplications and known preambles modulated by DBPSK, and outputting the calculated correlation values; and detecting preamble index of a target base station with the calculated correlation values to select a target cell, and estimating integer carrier frequency offset with respect to the target base station.

22 Claims, 7 Drawing Sheets

APPARATUS AND METHOD FOR PREAMBLE DETECTION AND INTEGER CARRIER FREQUENCY OFFSET ESTIMATION

TECHNICAL FIELD

The present invention relates to wireless communication systems, and more particularly, to preamble detection and integer carrier frequency offset (ICFO) estimation for a mobile station (MS) in a cellular wireless communication system based on orthogonal frequency division multiplexing (OFDM) or orthogonal frequency division multiplexing access (OFDMA).

BACKGROUND

In OFDM or OFDMA systems, such as IEEE 802.16d/e system, the preamble is designed in consideration to support systems working in various frequency multiplexing schemes including the scheme in which the multiplexing factor is 1. Cell ID (or IDCell) and segment number embedded in the preamble can be used as identification of the cell and the sector respectively, which are also utilized as an item of permutation generator for subcarrier mapping and as an initialization vector of pseudo-random binary sequence (PRBS) generator for subcarrier randomization. Only after the preamble pattern has been correctly detected, the MS can then correctly de-map and de-randomize the subcarrier, and further demodulate/decode OFDMA symbols following the preamble in a downlink frame.

There are altogether 114 preamble codes or preamble patterns specified in the IEEE 802.16d/e system. These preamble sequences are generated through computer searching. The preamble codes have therebetween low cross-correlation values in frequency domain and low peak to average power ratio (PAPR) in time domain. For scalable OFDMA systems such as IEEE 802.16e, the length of a preamble code is different for various FFT sizes.

The preamble codes are modulated to specific pilot subcarriers according to the corresponding segment number by:

$$\text{PreambleCarrierSet}_{seg} = \text{seg} + 3k \quad (1)$$

where PreambleCarrierSet$_{seg}$ specifies all subcarriers allocated to the preamble code, seg is the segment number indexed from 0 to 2, and k is a running index from 1 to the length of the preamble code.

Each preamble code has its unique preamble index, IDCell and segment number. For instance, for FFT-2048 (indicating that the FFT size equals to 2048; FFT-512 and FFT-1024 appearing hereinafter indicate that the FFT size equals to 512 and 1024, respectively), the preamble code with Index=0, IDCell=0 and Segment=0 is:
W$_k$=0xC12B7F736CFFB14B6ABF4EB50A60B7A3B4-163EA3360F697C45075
997ACE17BB1512C7C0CEBB34B389D8784553-C0FC60BDE4F166CF7B048
56442D97539FB915D80820CED D858483 (in Hex type).

The preamble code is modulated by $2\sqrt{2}$ boosted BPSK modulation as:

$$\begin{cases} \text{Re}\{X(k)\} = 2\sqrt{2} \cdot X'(k) = 2\sqrt{2} \cdot 2(1/2 - W_k) \\ \text{Im}\{X(k)\} = 0 \end{cases} \quad (2)$$

where X'(k) is the preamble code after the BPSK modulation, X(k) is the boosted preamble code, and Re(•) and Im(•) are respectively real part and virtual part acquisition calculations.

After modulation, these modulated symbols are mapped to pilot subcarriers and zero is used to fill the unallocated subcarriers. As should be noted, however, if a DC subcarrier is precisely included in a pilot position to which the preamble code corresponds, no modulation will be made and the code corresponding to this position will be discarded. FIG. 1 shows the structures of the preamble of FFT-512 and FFT-1024 based on the IEEE 802.16e, wherein a preamble code is modulated at intervals of every three subcarriers except the left and right virtual carriers. A base station (BS) or a sector of a BS has its unique preamble code and is transmitted in the head of every frame.

FIG. 2 shows cross-correlation characteristics among preamble codes. As shown in FIG. 2, the cross-correlation values among different preamble codes are low, but the self-correlation values of each preamble code are high. Therefore, in the receiver of a mobile station, preamble index can be detected by the conventional cross correlation between a post-FFT preamble and the known preamble codes like the detection of the conventional pseudo noise (PN) code. Detection is also possible by the differential cross correlation method in view of preventing channel fading and timing offset. After the correlation calculation, the code with the maximum correlation value is taken as the preamble index of the target BS.

However, during the initial synchronization period, there is usually a carrier frequency offset (CFO) between the BS and the MS. The oscillator of the MS is generally not provided with high accuracy out of commercial considerations. As a result, the carrier frequency offset is larger than one subcarrier spacing, that is to say, there is an integer carrier frequency offset (ICFO) between the MS and the BS. In this case, preamble sequence in the frequency domain will be shifted along the subcarrier axis. Conventional preamble detection method cannot work in this situation. Consequently, there is a need for a preamble detection algorithm and a preamble detection apparatus operating accurately in large carrier frequency offset environment (especially in integer carrier frequency offset environment), and a need for an integer carrier frequency offset (ICFO) estimator.

Additionally, the MS needs to choose a BS with the best channel condition as the target BS for initial network access. Conventional BS or cell selection method only makes decision from the preamble detection result of one frame. However, when an MS approaches a cell edge, it can receive signals from a plurality of BSs. The fading paths between the MS and each BS are normally independent. The different fading paths will easily mislead selection of the target BS if only one preamble detection is relied upon. Accordingly, there is also a need for a reliable cell selector during the initial network access.

SUMMARY OF THE INVENTION

It is therefore an object of the present invention to provide an apparatus and method for quickly and accurately detecting preamble code in a carrier frequency offset existing environment, especially in an integer carrier frequency offset (ICFO) existing environment.

Another object of the present invention is to provide an apparatus and method for detecting preamble index and estimating integer carrier frequency offset.

Still another object of the present invention is to provide an apparatus and method for reliably selecting a target base station during initial network access procedure.

In order to achieve the aforementioned objects, there is provided in the present invention an apparatus for preamble detection and integer carrier frequency offset estimation, which apparatus comprises a subcarrier windowing device for determining the window of useful subcarriers in preamble transformed to frequency domain based on pre-determined possible integer carrier frequency offset and the length of the preamble, so as to select the useful subcarriers; a subcarrier shift extractor for extracting a plurality of subcarrier sequences having a length equal to that of the preamble from the useful subcarriers; a conjugative multiplier for calculating conjugative multiplications of each subcarrier and its neighboring subcarrier in the subcarrier sequences extracted; a real part acquirer for acquiring the real part of the conjugative multiplications; a cross correlator for calculating the cross correlations between the real part of the conjugative multiplications and known preambles modulated by DBPSK, and outputting the calculated correlation values; and a cell and integer carrier frequency offset selector for detecting preamble index of a target base station with the calculated correlation values, and selecting a target cell, and estimating integer carrier frequency offset with respect to the target base station.

The apparatus for preamble detection and integer carrier frequency offset estimation according to this invention can further comprise a subcarrier divider for selecting subcarriers every three tone from the useful subcarriers, and dividing the useful subcarriers into three groups, and wherein the subcarrier shift extractor extracts a plurality of subcarrier sequences having a length equal to that of the preamble from each of the groups.

The apparatus for preamble detection and integer carrier frequency offset estimation according to this invention can further comprise a fast Fourier transformer for transforming a received preamble to frequency domain and outputting the transformed preamble to the subcarrier windowing device.

The apparatus for preamble detection and integer carrier frequency offset estimation according to this invention can further comprise a preamble storage for storing predetermined known preambles; and a DBPSK modulator for DBPSK modulating the known preambles stored in the preamble storage, and outputting the DBPSK modulated known preambles to the cross correlator.

Additionally, the cell and integer carrier frequency offset selector in the apparatus for preamble detection and integer carrier frequency offset estimation according to this invention comprises a threshold comparator for comparing, for a plurality of frames, each correlation value outputted by the cross correlator with a multiplication between a pre-selected threshold and the sum of all correlation values; a counter, for counting a frame when there are correlation values greater than the multiplication in the frame; a group of delay registers for storing, when there are correlation values greater than the multiplication, the correlation values greater than the multiplication and preamble indices, shift indices and group indices thereof; a correlation value averager for averaging, when the count value of the counter reaches a predetermined value, the stored correlation values with the same preamble index, shift index and group index; a maximum selector for selecting the preamble index, shift index and group index corresponding to the maximum average correlation value; and a cell ID and integer carrier frequency offset mapper for determining a target base station, deriving a target cell ID, and the integer carrier frequency offset between a mobile station and the target base station, based on the selected preamble index, shift index and group index.

In order to achieve the aforementioned objects, there is further provided in the present invention a method for preamble detection and integer carrier frequency offset estimation, which method comprises the steps of determining the window of useful subcarriers in preamble transformed to frequency domain based on pre-determined possible integer carrier frequency offset and the length of the preamble, so as to select the useful subcarriers; extracting a plurality of subcarrier sequences having a length equal to that of the preamble from the useful subcarriers; calculating conjugative multiplications of each subcarrier and its neighboring subcarriers in the subcarrier sequences extracted; acquiring the real part of the conjugative multiplications; calculating the cross correlations between the real part of the conjugative multiplications and known preambles modulated by DBPSK, and outputting the calculated correlation values; and detecting preamble index of a target base station with the calculated correlation values, and selecting a target cell, and estimating integer carrier frequency offset with respect to the target base station.

The method for preamble detection and integer carrier frequency offset estimation according to this invention further comprises a step of selecting subcarriers every three tone from the useful subcarriers, and dividing the useful subcarriers into three groups, and in the step of extracting the subcarrier sequences, extracting a plurality of subcarrier sequences having a length equal to that of the preamble from each of the groups.

The method for preamble detection and integer carrier frequency offset estimation according to this invention further comprises a step of transforming a received preamble to frequency domain, prior to the step of selecting the useful subcarriers.

The method for preamble detection and integer carrier frequency offset estimation according to this invention further comprises a step of DBPSK modulating known preambles stored previously, prior to the step of calculating the cross correlations.

The step of selecting the target cell and estimating the integer carrier frequency offset in the method for preamble detection and integer carrier frequency offset estimation according to this invention comprises the steps of comparing, for a plurality of frames, each correlation value with a multiplication between a pre-selected threshold and the sum of all correlation values; counting a frame when there are correlation values greater than the multiplication in the frame; storing, when there are correlation values greater than the multiplication, the correlation values greater than the multiplication and preamble indices, shift indices and group indices thereof; averaging, when the count value in the step of counting reaches a predetermined value, the stored correlation values with the same preamble index, shift index and group index; selecting the preamble index, shift index and group index corresponding to the maximum average correlation value; and determining a target base station, deriving a target cell ID, and the integer carrier frequency offset between a mobile station and the target base station, based on the selected preamble index, shift index and group index.

According to the first aspect of the present invention, in a receiver for an MS in the OFDM/OFDMA-based cellular mobile communication system, the subcarrier windowing device determines the bound of the useful subcarriers based on the structure of the preamble code and the possible integer carrier frequency offset after the FFT transformation of a preamble code. The subcarrier divider divides the useful subcarriers into three groups, which are used to accelerate the detection speed by a parallel processing method. The subcarrier shift extractor shiftly extracts detection sequences from each group of the subcarriers, with each of the detection sequences as extracted having a unique shift index. The conjugative multiplier performs conjugative multiplication on each sample of the detection sequences with the adjacent sample. The cross correlator calculates the correlations between conjugative correlation values and DBPSK modulated known preamble codes.

According to the second aspect of the present invention, in a receiver for an MS in the OFDM/OFDMA-based cellular mobile communication system, correlation values are fed into the cell and integer carrier frequency offset selector. For the sake of mitigating influence of various channel fadings from plural BSs on initial cell selection, the cell and integer carrier frequency offset selector according to this invention performs selection on the basis of the average result of detection of plural frames rather than the detection result of one frame. In the cell and integer carrier frequency offset selector, each correlation value is compared with a multiplication product between a pre-selected threshold and the sum of all correlation values with regard to each frame, the correlation values greater than this multiplication product are stored in a register as candidates for the target base station, the preamble indices, shift indices and group indices to which the correlation values correspond are also stored, and the frame is counted by means of a counter. After continuous counting of a predetermined number of frames, the stored correlation values having the same preamble index, shift index and group index are averaged. Subsequently, the maximum selector selects the maximum average value as the correlation value to which the target base station corresponds. The IDCell and the segment number of the target base station, and the integer carrier frequency offset between the mobile station and the target base station are derived.

According to the third aspect of the present invention, in the preamble detection method, the bound of useful subcarriers is set by a pre-determined possible pilot structure and the integer carrier frequency offset. The detection sequences are extracted by a sliding window having the same length as the number of useful subcarriers of IEEE 802.16e/d, and these detection sequences are differentially cross-correlated with the known preamble codes.

According to the fourth aspect of the present invention, in the estimation of the cell and the integer carrier frequency offset, the preamble index and the integer carrier frequency offset are detected according to a plurality of frames. The differential correlation value of each frame is compared with a multiplication product between a pre-determined threshold and a sum of all correlation values. The correlation values having the same preamble index, shift index and group index and being greater than the multiplication product are averaged. The maximum average value is taken as the correlation value of the target base station, and its IDCell and integer carrier frequency offset are finally derived.

BRIEF DESCRIPTION OF THE DRAWINGS

The accompanying drawings included herein provide further understanding to the present invention, and they are incorporated into the Description and constitute a part thereof. The drawings describe the embodiments of this invention, and explain the principle of this invention together with the Description. In the drawings.

DETAILED DESCRIPTION

The preferred embodiments and examples in this invention should be regarded as exemplary in nature, and are not meant to restrict this invention.

This invention is directed to providing a reliable and fast apparatus and method for preamble detection for a receiver of a mobile station in a cellular OFDM/OFDMA system.

This invention is further directed to providing an apparatus and method for simultaneous preamble detection and integer carrier frequency offset estimation for a receiver of a mobile station in a cellular OFDM/OFDMA system.

This invention is still further directed to providing a reliable cell selection apparatus and method for network access of a mobile station in a cellular OFDM/OFDMA system, which apparatus and method can select a neighboring base station having the best channel condition as the target base station.

This invention as discussed hereinbelow is applicable to any cellular OFDM/OFDMA system having a set of PN-code-like preamble codes embedded with information of cell ID.

Before describing this invention, correlation properties of preamble codes in the exemplary system of IEEE 802.16d/e will be further explained.

Figure 1:
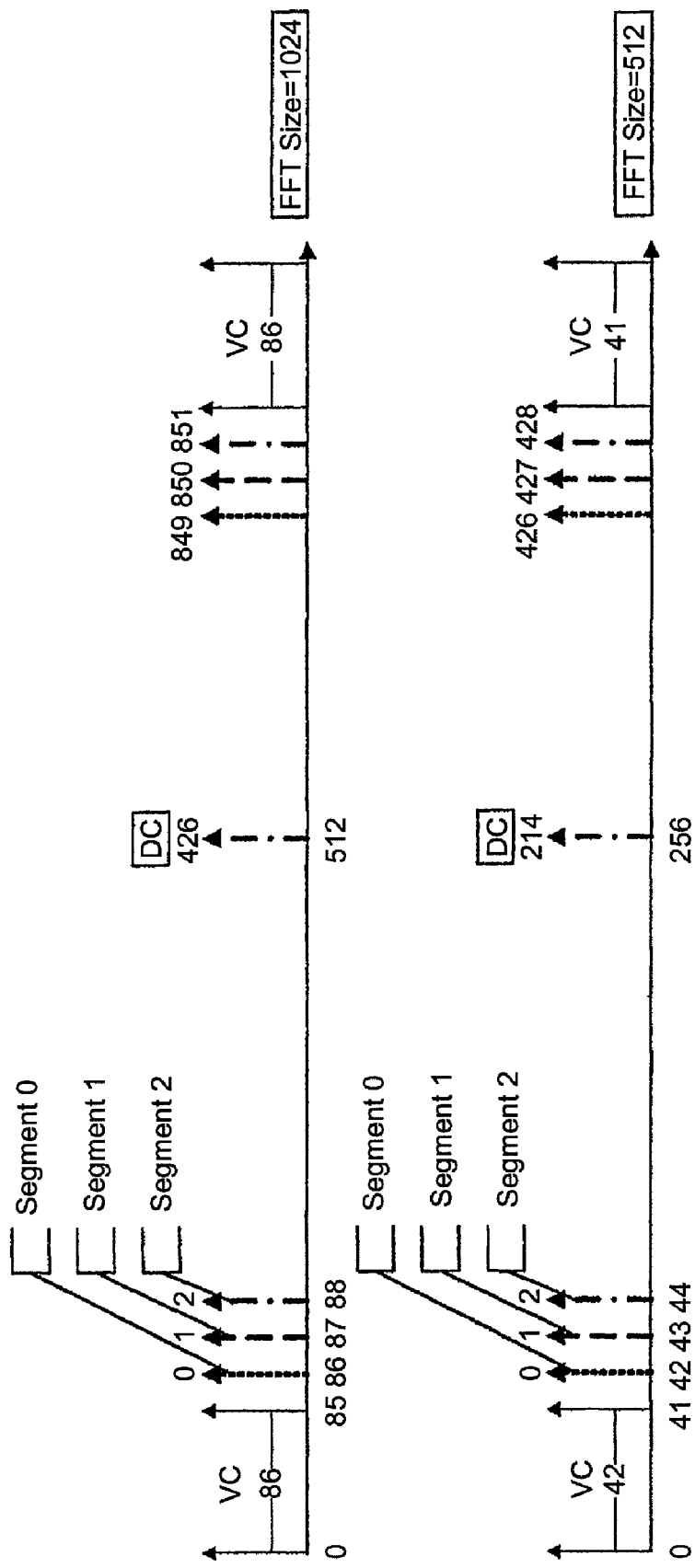
FIG. 1 shows exemplary preamble structure of FFT-512 and FFT-1024 in an 802.16.e system.
Figure 2:
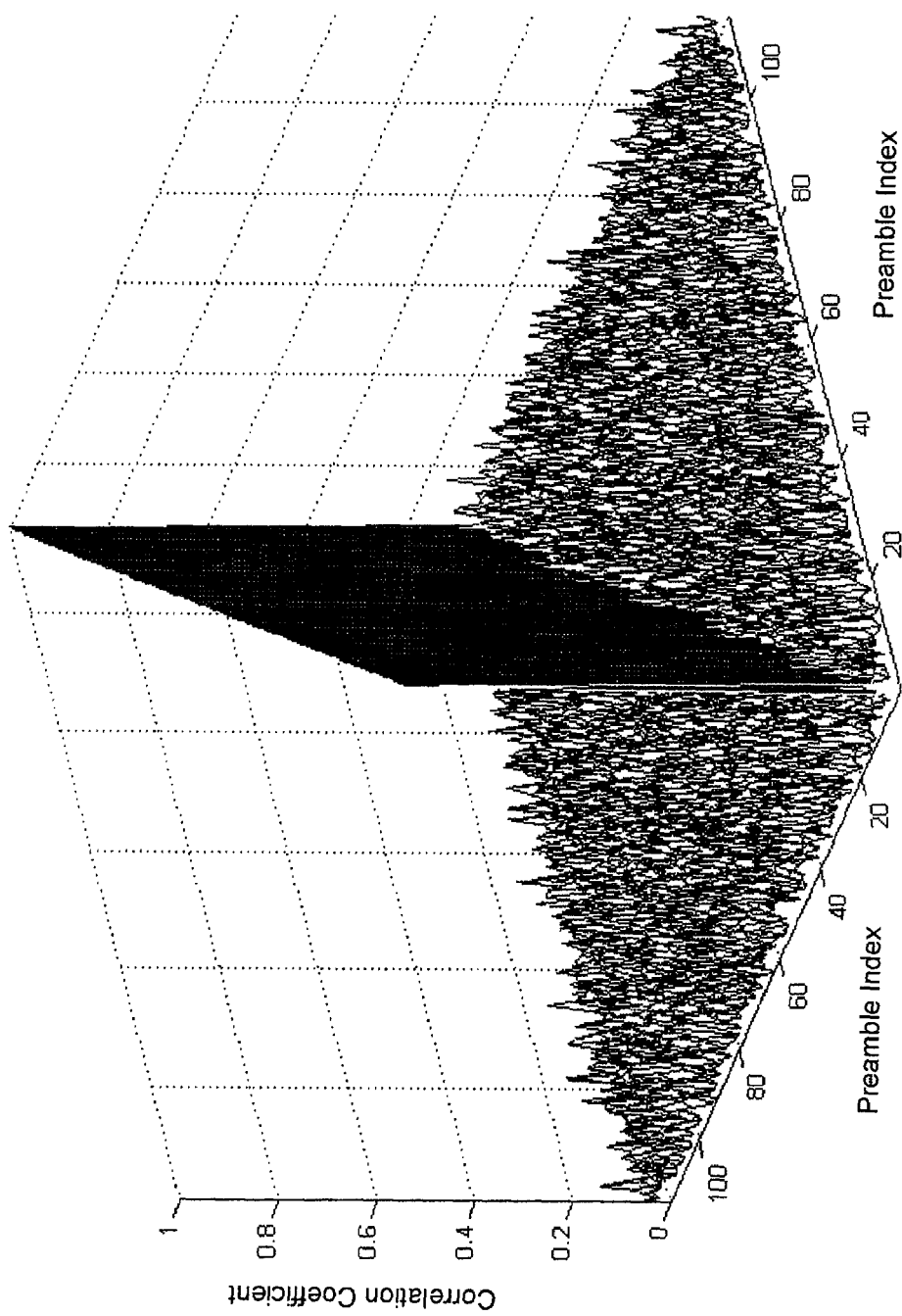
FIG. 2 shows cross correlation coefficients between preamble codes of FFT-1024 defined in IEEE 802.16e.
Figure 3:
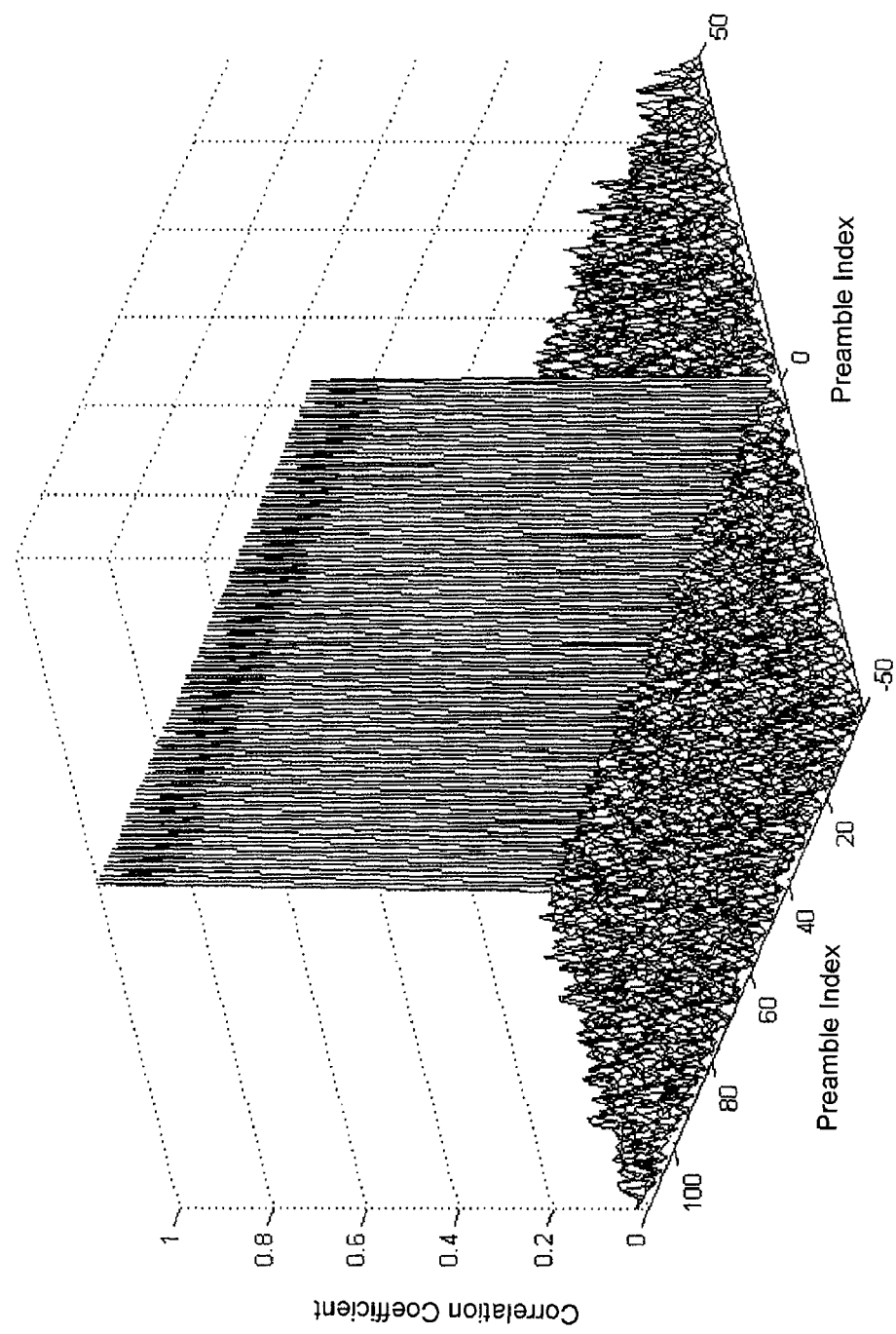
FIG. 3 shows auto correlation coefficients of preamble codes of FFT-1024 defined in IEEE 802.16e.

Referring to FIG. 2, the peak value of cross correlation always occurs between two preamble codes having the same index, and the cross correlation value between two preamble codes having different indices is very low. This characteristic can be used to identify different cells and sectors according to the received signal. On the other hand, the preamble codes also have near orthogonal auto correlation characteristics. As shown in FIG. 3, the auto correlation value of a preamble code with its shifted copy is very low. The auto correlation peak value only occurs when a preamble code is correlated with its copy having not shifted at all. This characteristic is employed in the integer carrier frequency offset estimation in this invention.

Figure 4:
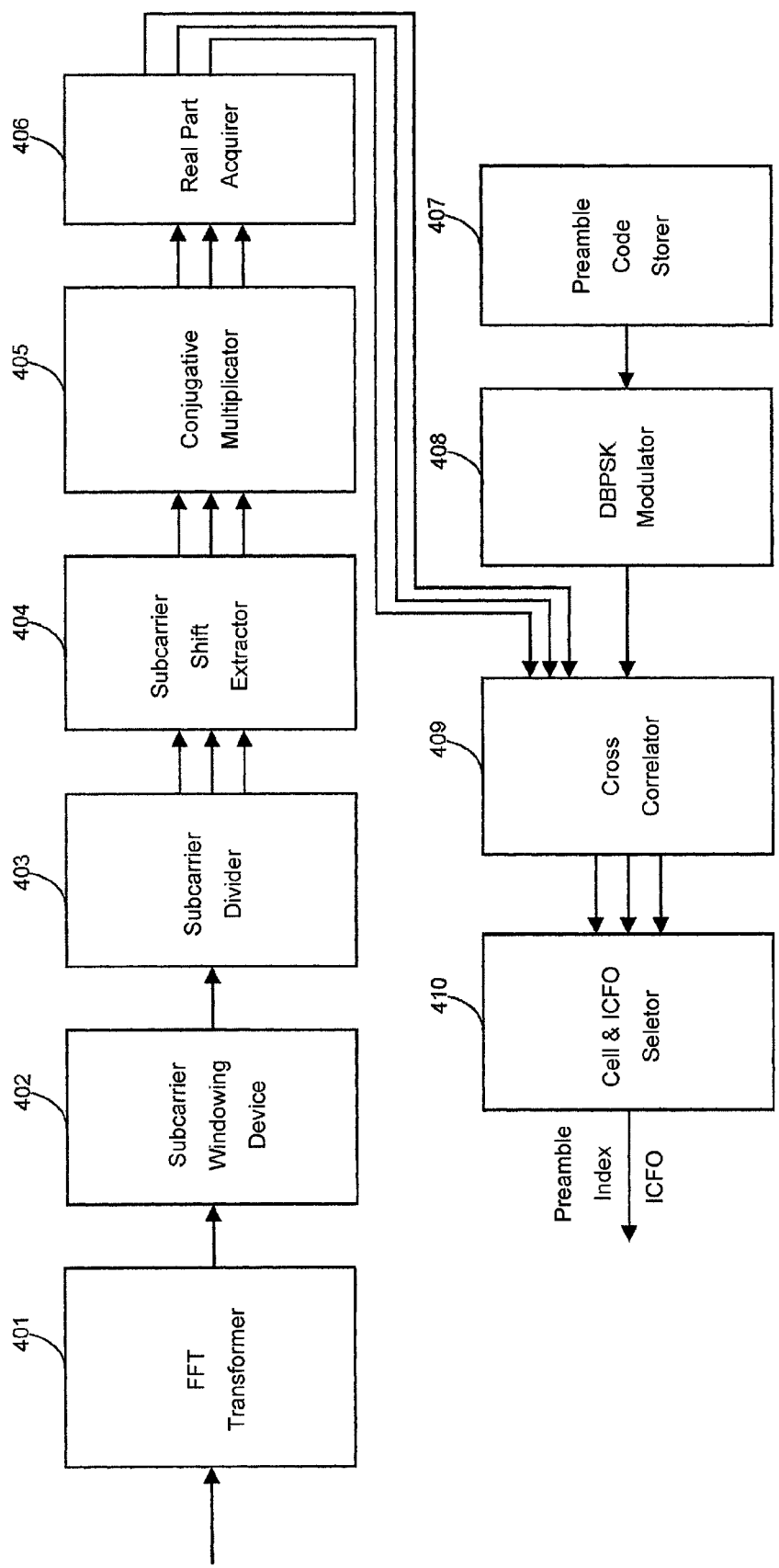
FIG. 4 is a block diagram showing an apparatus for preamble detection and integer carrier frequency offset estimation for a mobile station in a cellular OFDM/OFDMA system according to an embodiment of the present invention.

FIG. 4 is a block diagram showing an apparatus for preamble detection and integer carrier frequency offset estimation for a receiver in a cellular OFDM/OFDMA system according to an embodiment of the present invention.

As shown in FIG. 4, the apparatus for preamble detection and integer carrier frequency offset estimation according to this invention comprises a subcarrier windowing device 402 for determining the bound of useful subcarriers in preamble transformed to frequency domain based on pre-determined possible integer carrier frequency offset and the length of the preamble, so as to select the useful subcarriers; a subcarrier shift extractor 404 for extracting a plurality of subcarrier sequences having a length equal to that of the preamble from the useful subcarriers; a conjugative multiplier 405 for calculating conjugative multiplications of each subcarrier and its neighboring subcarriers in the subcarrier sequences extracted; a real part acquirer 406 for acquiring the real part of the conjugative multiplications; a cross correlator 409 for calculating the cross correlations between the real part of the conjugative multiplications and known preambles modulated by DBPSK, and outputting the calculated correlation values; and a cell and integer carrier frequency offset selector 410 for detecting preamble index of a target base station with the calculated correlation values to select a target cell, and estimating integer carrier frequency offset with respect to the target base station.

The apparatus for preamble detection and integer carrier frequency offset estimation according to this invention may further comprise a subcarrier divider 403 for selecting subcarriers every three tone from the useful subcarriers to divide the useful subcarriers into three groups, so as to achieve parallel processing on subsequent operations to accelerate the detection speed, wherein the subcarrier shift extractor 404 extracts a plurality of subcarrier sequences having a length equal to that of the preamble from each of the groups of the subcarriers.

The apparatus for preamble detection and integer carrier frequency offset estimation according to this invention may further comprise an FFT transformer 401 for transforming a received preamble to frequency domain and outputting the transformed preamble to the subcarrier windowing device 402.

The apparatus for preamble detection and integer carrier frequency offset estimation according to this invention may further comprise a preamble storage 407 for storing predetermined known preambles, which can be, for instance, the 114 preambles defined in IEEE 802.16d/e; and a DBPSK modulator 408 for DBPSK modulating the known preambles stored in the preamble storage 407, and outputting the DBPSK modulated known preambles to the cross correlator 409.

Figure 6:
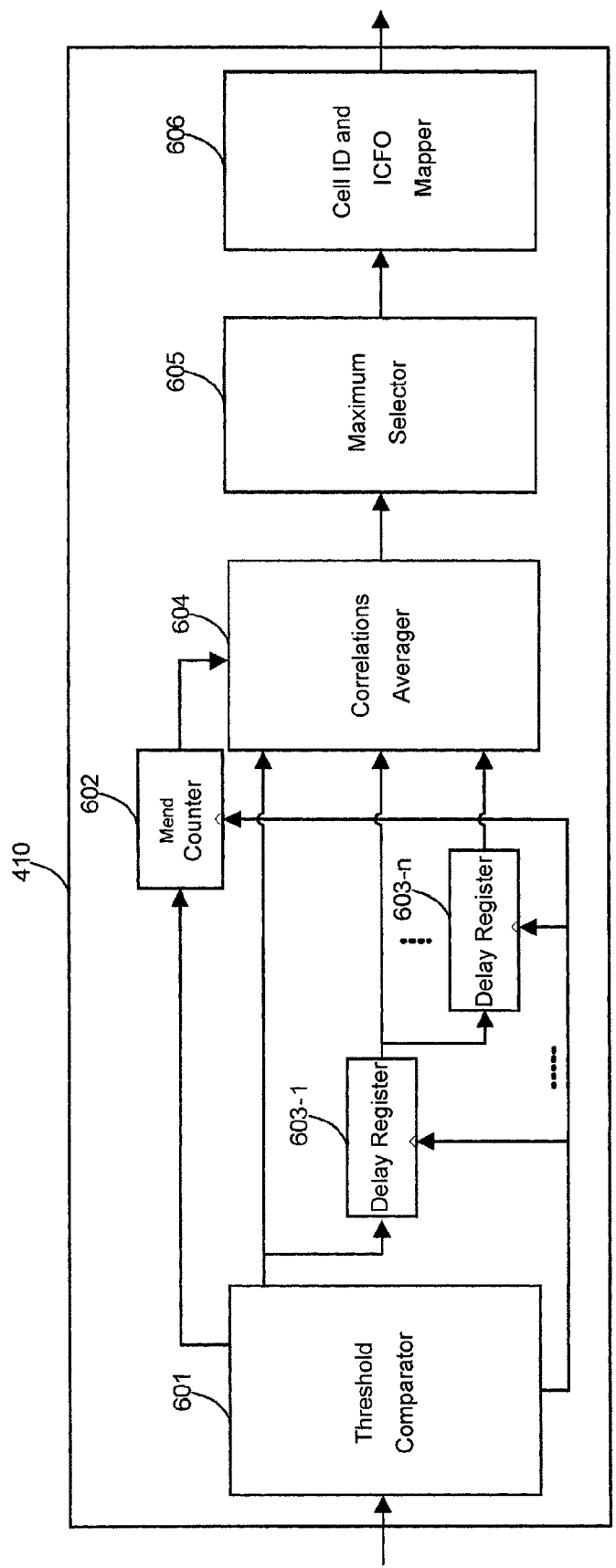
FIG. 6 shows the structure of the cell and integer carrier frequency offset selector in the apparatus for preamble detection and integer carrier frequency offset estimation in a cellular OFDM/OFDMA system according to an embodiment of the present invention.

FIG. 6 shows the structure of the cell and integer carrier frequency offset selector 410 in the apparatus for preamble detection and integer carrier frequency offset estimation according to this invention.

As shown in FIG. 6, the cell and integer carrier frequency offset selector 410 comprises a threshold comparator 601 for comparing, for a plurality of frames, each correlation value outputted by the cross correlator 409 with a multiplication between a pre-selected threshold and the sum of all correlation values; a Mend counter 602 for counting a frame when the correlation value is greater than the multiplication; delay registers 603-1 through 603-$n$ for storing, when the correlation value is greater than the multiplication, the correlation value and the preamble index, shift index and group index corresponding thereto; a correlation value averager 604 for averaging, when the count value of the Mend counter reaches a predetermined value, the stored correlation values with the same preamble index, shift index and group index; a maximum selector 605 for selecting the preamble index, shift index and group index having the maximum average value; and a cell ID and integer carrier frequency offset mapper 606 for determining a target base station, deriving a target cell ID, and the integer carrier frequency offset between a mobile station and the target base station, based on the selected preamble index, shift index and group index.

Refer below to the flowchart in FIG. 7 to explain the detailed operation of the apparatus for preamble detection and integer carrier frequency offset estimation according to this invention.

Figure 7:
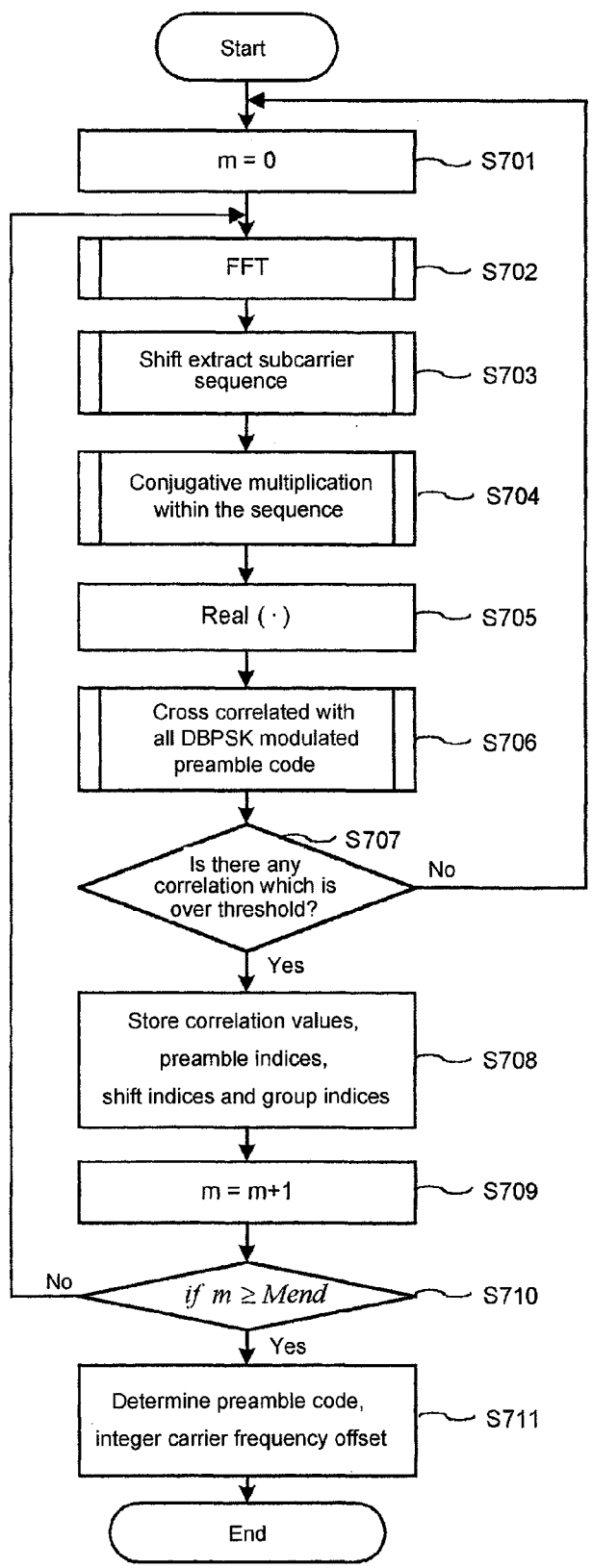
FIG. 7 is a flowchart showing the preamble detection, integer carrier frequency offset estimation and cell selection according to an embodiment of the present invention.

FIG. 7 is a flowchart showing the preamble detection, integer carrier frequency offset estimation and cell selection according to an embodiment of the present invention.

The count value of the Mend counter 602 is initialized as zero in step S701.

Subsequently in step S702, the received preamble code is transformed to frequency domain by the FFT transformer 401 in accordance with frame timing, the post-FFT preamble can be modeled as:

$$Y(k)=H(k)X(k)+n(k), k=1\ldots N_{\mathit{fft}} \quad (3)$$

where Y(k) and H(k) are respectively the receiving signal and the channel response in the frequency domain, X(k) is the received preamble code, n(k) is white Gaussian noise in the subcarrier, k is the sequence number of the subcarrier, and $N_{\mathit{fft}}$ is the FFT size.

In step S703, the bound of the useful subcarriers in the preamble transformed to the frequency domain is firstly determined based on the predetermined possible integer carrier frequency offset and the length of the preamble, so as to select the useful subcarriers.

When there is integer carrier frequency offset between the mobile station and the base station, the received preamble pilot sequence will shift leftwards or rightwards along the subcarrier axis, and the shift value of the subcarrier is equal to the value of the integer frequency offset. Based on the device parameter of the crystal oscillation selected by the mobile station, it is possible to predetermine the possible integer carrier frequency offset. Usually, number with multiples of three is recommended for the subcarrier spacing, for example, 3 subcarrier spacing or 6 subcarrier spacing. In accordance with the values of the left and right virtual carriers defined according to standard and in consideration of the predetermined integer frequency offset, the bound of the useful subcarrier can be determined in the subcarrier windowing device 402.

The beginning position of the window is:

$$N_{begin}=N_{LVC}-\text{PICFO}$$

The ending position of the window is:

$$N_{end}=N_{RVC}+\text{PICFO}$$

The length of the useful subcarrier window is:

$$N_{win}=3N_{CodeLen}+2\text{PICFO} \quad (4)$$

where PICFO is the predetermined possible integer carrier frequency offset, $N_{LVC}$ and $N_{RVC}$ are respectively the numbers of the left and the right virtual carriers, and $N_{CodeLen}$ is the length of the preamble code, for instance, 284 for FFT-1024 in IEEE 802.16e.

In order to accelerate the detection speed, in the subsequent step S703, subcarriers spaced at every three tones are selected from the useful subcarriers to divide the useful subcarriers into three groups.

Figure 5:
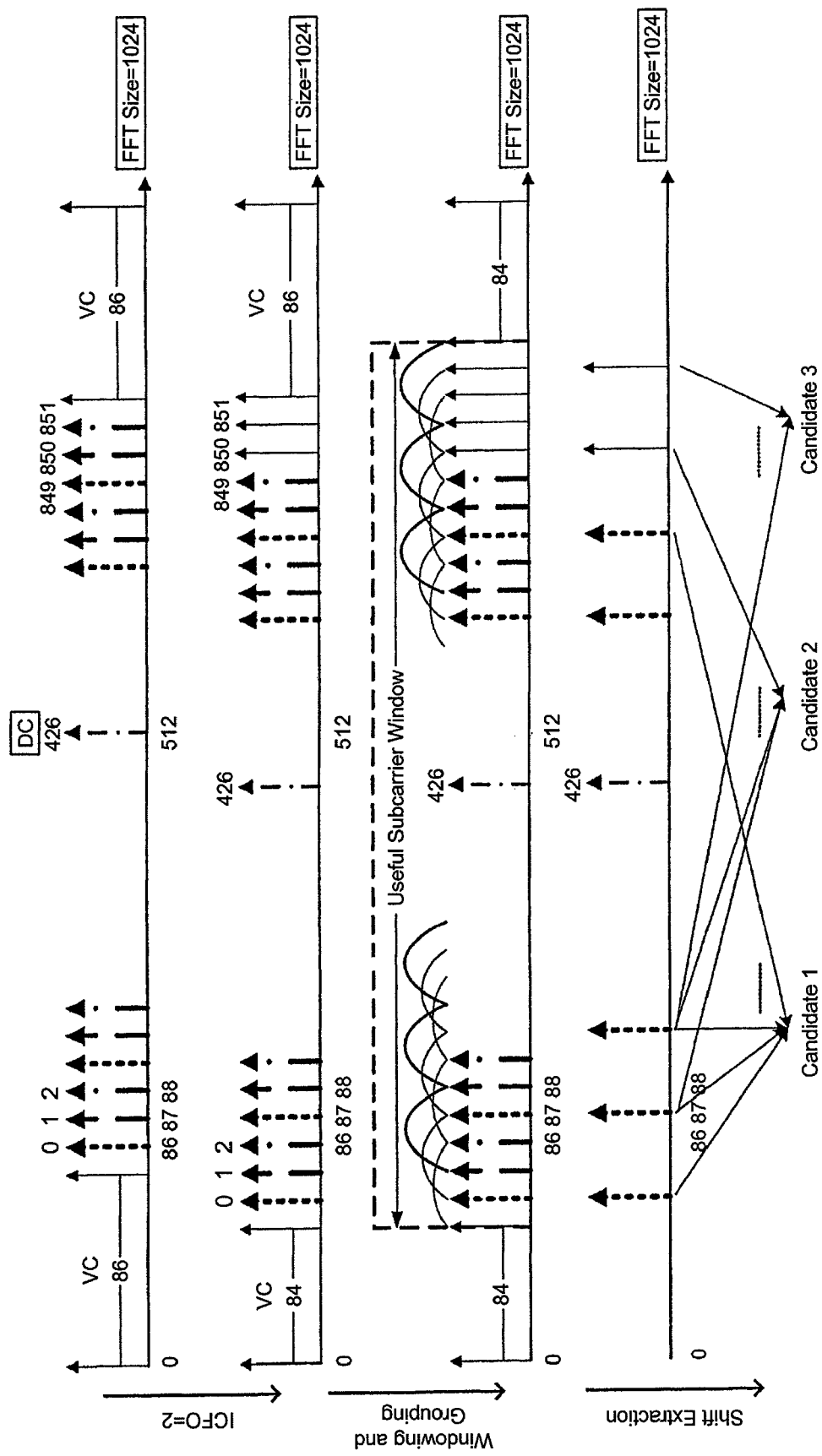
FIG. 5 shows the dividing and extracting processes of the subcarrier divider and the subcarrier shift extractor.

The subcarriers in the useful subcarrier window are divided into three groups by means of the subcarrier divider 403 in accordance with the structure of the pilot subcarrier of the preamble to perform subsequent parallel processing. The method for dividing the subcarriers is as shown in FIG. 5. Subcarriers spaced at every three tones are considered to belong to the same group.

Then in step S703, a plurality of subcarrier sequences having the same length as that of the preamble are extracted from each group of the subcarriers.

Subcarriers are shift-extracted from each group by means of the subcarrier shift extractor 404. The extracting method is as follows: sequentially extracting a subcarrier sequence having the same length as the preamble sequence from the beginning of a group sequence, shifting rightwards by one position to extract a sequence having the same length as the preamble in the same manner, and continuing the process till the end of the group sequence. The number of the sequences extracted from each group is equal to the number of the predetermined integer frequency offset PICFO. Referring to the example shown in FIG. 5, in the case where PICFO=3, three candidate subcarrier sequences of preamble detection are extracted from one group, and there are altogether nine candidate subcarrier sequences in the three groups. Thus, integer frequency offsets less than or equal to ±3 can be at least detected.

In the above description of the present invention, the subcarrier shift extractor 404 shift-extracts a plurality of subcarrier sequences to enable subsequent parallel processing only after the subcarriers in the useful subcarrier window have been divided. However, the present invention is not restricted thereto, as it is also possible to directly extract a plurality of subcarrier sequences from the useful subcarriers by means of the subcarrier shift extractor 404 without dividing the useful subcarriers.

After extraction, the subcarrier in each sequence is described as:

$$Y(l^{s,m})=H(l^{s,m})X(l^{s,m})+n(l^{s,m}) \quad (5)$$

where l is the value from 1 to $N_{CodeLen}$, s is the value from 0 to 2, m is the value from −PICFO/3 to +PICFO/3, $l^{s,m}=N_{LVC}+s+(m+l−1)*3$, and $N_{LVC}$ is the number of the left virtual carriers, for instance, the number of the left virtual carriers is 86 for FFT-1024 in IEEE 802.16e.

Considering the timing offset between the mobile station and the base station, especially during the initial synchronization period, differential multiplication is employed to remove the influence of the timing offset. This is also helpful to combating channel fading effect.

Suppose the timing error of FFT windowing is $\tau T_s$, where $\tau$ is the number of samples of the timing error, and $T_s$ is the sample interval. Thus, the received preamble pilot subcarrier can be modeled as:

$$Y(l^{s,m})=(X(l^{s,m})H(l^{s,m})+n(l^{s,m}))e^{-j2\pi l\tau/N_{fft}} \quad (6)$$

Then in step S704, conjugative multiplication of each extracted subcarrier with its adjacent subcarrier is calculated.

The conjugative multiplier 405 multiplies each subcarrier in $Y(l^{s,m})$ with its adjacent subcarrier. Since channel fading responses between adjacent subcarriers are almost identical, influence of the channel fading on the preamble detection can be removed:

$$D_Y(l^{s,m})=Y(l^{s,m})Y^*(l+1)^{s,m}\approx((X(l^{s,m})X^*(l+1)^{s,m}))$$
$$|H(l^{s,m})|^2 e^{-j2\pi 3\tau/N_{fft}} \quad (7)$$

Usually, $|\tau|<N_{CP}=N_{fft}/8$, where $N_{CP}$ is the length of cyclic prefix. This means that the real part of $D_Y(l^{s,m})$ is much larger than the virtual part of $D_Y(l^{s,m})$.

Thus, in step S705, the real part acquirer 406 extracts the value of the real part of the sequence for preamble detection, namely:

$$RD_Y(l^{s,m})=\text{real}(D_Y(l^{s,m}))=\text{real}(((X(l^{s,m})X^*(l+1)^{s,m}))|H(l^{s,m})|^2 e^{-j2\pi 3\tau/N_{fft}})\approx((X(l^{s,m})X^*(l+1)^{s,m}))|H(l^{s,m})|^2 \quad (8)$$

This method is simpler for circuit implementation than the conventional modulus method.

Subsequently, in order to perform the preamble detection, known preamble codes are firstly DBPSK modulated in step S706. This process can be performed at any time before step S706, and the DBPSK modulated known preamble codes are outputted to the cross correlator 409 in step S706.

The DBPSK modulator 408 performs DBPSK modulation on the BPSK preamble codes stored in the preamble storage 407:

$$D^i_X(l)=X'_i(l)X'_i(l+1) \quad (9)$$

where i indicates the sequence number of the known preamble codes, l is the code bit index of the preamble codes, the value of l is from 1 to $N_{CodeLen}$, and $X'_i(l)$ is the BPSK modulated preamble code, which is not power boosted as in Equation (2).

Subsequently, the cross correlation between the real part of the conjugative multiplication and the DBPSK modulated known preamble codes is calculated in step S706.

The cross correlator 409 calculates the cross correlation between $RD_Y(l^{s,m})$ and the DBPSK modulated preamble codes, as shown in the following Equation:

$$C^{s,m}(i)=\text{corr}(D^i_X, RD^{s,m}_Y)=\sum_{l=m}^{m+N_{CodeLen}} RD_Y(l^{s,m})D^i_X(l) \quad (10)$$

As should be noted here, $D^i_X(l)$ is actually a sign bit sequence. The multiplication calculation in Equation (10) is actually equal to bit summation between the sign bit of $RD_Y(l^{s,m})$ and $D^i_X(l)$. Thus, the calculation complexity in the cross correlator 409 is only equal to summation of float number.

The correlation value calculated in step S706 is outputted to the cell and integer carrier frequency offset selector 410.

Then in step S707 to step S711, the preamble index and the integer carrier frequency offset are detected by means of the cell and integer carrier frequency offset selector 410 by using the correlation results of plural frames, rather than that of a single frame.

Firstly in step S707, the threshold comparator 601 compares $C^{s,m}(i)$ with a multiplication product between a pre-selected threshold ca and a summation of all correlation values.

If all correlation values of $C^{s,m}(i)$ for a frame are less than the multiplication of the threshold, the process is returned to step S701 where a clear signal is enabled to reset the Mend counter and clear all correlation values stored in the registers 603-1 through 603-n.

If there are correlation values that satisfy the following Equation (11) for a frame, these correlation values and the corresponding preamble index i, shift index m and group index s are stored in the registers 603-1 through 603-n in step S708 for further selection.

$$\tilde{C}^{s,m}_t(i) \geq \alpha \sum_{i,m,s} C^{s,m}_t(i) \quad (11)$$

where α is a pre-selected threshold, and t is used to mark the current frame number.

When there are correlation value outputs from the threshold comparator 601 for a frame, the Mend counter 602 counts the frame in step S709.

The counter modulus value $M_{end}$ of the Mend counter 602 is a predetermined value, and it is judged in step S710 as to whether the count value of the Mend counter 602 is greater than or equal to the counter modulus value $M_{end}$.

When the count value of the Mend counter 602 is less than the counter modulus value $M_{end}$, the process is returned to step S702 to continue for the detection of the next frame.

When and only when the count value of the Mend counter 602 is greater than or equal to the counter modulus value $M_{end}$, that is to say, when there is $C^{s,m}(i)$ greater than the multiplication of the threshold a for a continuous $M_{end}$ number of frames, the process proceeds to step S711.

In step S711, the Mend counter 602 enables the correlation value averager 604, which averages the $\tilde{C}_t^{s,m}(i)$ having the same index s, index m and index i, as shown in the following Equation (12):

$$\text{Avg\_}\tilde{C}_t^{s,m}(i) = \frac{1}{M_{end}} \sum_{t=1}^{M_{end}} \tilde{C}_t^{s,m}(i) \quad (12)$$

Subsequently, the maximum selector 605 selects the maximum correlation value, which corresponds to preamble index $i_{pre}$, shift index $m_{shift}$, and group index $s_{group}$, namely:

$$\{i_{pre}, m_{shift}, s_{group}\} = \arg\max(\text{Avg\_}\tilde{C}_t^{s,m}(i)) \quad (13)$$

The $i_{pre}$ is taken as the detected preamble index of the target base station, and its corresponding cell ID IDCell and segment number SegNum are derived in the cell ID and integer carrier frequency offset mapper 606 based on the IEEE 802.16d/e standard.

Subsequently, the integer carrier frequency offset estimation Est_ICFO is also derived in the cell ID and integer carrier frequency offset mapper 606 according to the following Equation:

$$\text{Est\_ICFO} = 3 * m_{shift} + s_{group} - \text{SegNum} \quad (14)$$

The method and apparatus for preamble detection and integer carrier frequency offset estimation according to the present invention are explained in the above. According to the present invention, cross correlation characteristics and auto correlation characteristics of the preamble codes are respectively made use to identify different preamble codes and estimate integer carrier frequency offset, thereby making it possible to perform preamble detection in the existence of frequency offset, and also possible to simultaneously detect preamble codes and integer carrier frequency offsets.

It is easy for persons skilled in the art to conceive of various modifications and other embodiments of the present invention on the basis of the explanations to the principle of the present invention as detailed above. Therefore, the present invention is not restricted to the specific embodiments disclosed herein, but covers all modifications and other embodiments of the present invention insofar as they fall within the scope claimed in the claims attached herein.

What is claimed is:

1. An apparatus for preamble detection and integer carrier frequency offset estimation, comprising:
   a subcarrier windowing device for determining a window of useful subcarriers in a preamble transformed to the frequency domain based on a pre-determined possible integer carrier frequency offset and the length of the preamble, so as to select the useful subcarriers;
   a subcarrier shift extractor for extracting a plurality of subcarrier sequences from the useful subcarriers;
   a conjugative multiplier for calculating conjugative multiplications of each subcarrier and its neighboring subcarriers in the plurality of subcarrier sequences extracted;
   a real part acquirer for acquiring a real part of the conjugative multiplications;
   a cross correlator for calculating cross correlations between the real part of the conjugative multiplications and known preambles modulated by a differential phase shift keying modulation scheme, and outputting the calculated correlation values; and
   a cell and integer carrier frequency offset selector for detecting a preamble index of a target base station with the calculated correlation values, and selecting a target cell, and estimating integer carrier frequency offset with respect to the target base station.

2. The apparatus for preamble detection and integer carrier frequency offset estimation in claim 1, further comprising:
   a subcarrier divider for selecting subcarriers every three tone from the useful subcarriers, and dividing the useful subcarriers into three groups, and
   wherein the subcarrier shift extractor extracts a plurality of subcarrier sequences having a length equal to that of the preamble from each of the groups.

3. The apparatus for preamble detection and integer carrier frequency offset estimation in claim 1, further comprising:
   a fast Fourier transformer for transforming a received preamble to frequency domain and outputting a transformed preamble to the subcarrier windowing device.

4. The apparatus for preamble detection and integer carrier frequency offset estimation in claim 1, further comprising:
   a preamble storage for storing predetermined known preambles;
   a modulator for modulating the known preambles stored in the preamble storageby the differential phase shift keying modulation scheme, and outputting the modulated known preambles to the cross correlator.

5. The apparatus for preamble detection and integer carrier frequency offset estimation in claim 1, wherein the length of the window of the useful subcarriers is:

$$N_{win} = 3N_{CodeLen} + 2\text{PICFO}$$

wherein PICFO is the predetermined possible integer carrier frequency offset, $N_{CodeLen}$ is the length of the preamble.

6. The apparatus for preamble detection and integer carrier frequency offset estimation in claim 1, wherein the subcarrier shift extractor extracts, by way of shifting, a plurality of subcarrier sequences, and the number of the subcarrier sequences extracted being the predetermined possible integer carrier frequency offset, and each of the subcarrier sequences having unique group index and shift index, and the subcarriers in each of the subcarrier sequences can be described as:

$$Y(l^{s,m}) = H(l^{s,m})X(l^{s,m}) + n(l^{s,m})$$

wherein l is a value from 1 to $N_{CodeLen}$, s is a value from 0 to 2, m is a value from $-\text{PICFO}/3$ to $+\text{PICFO}/3$, PICFO is the predetermined possible integer carrier frequency offset, $N_{CodeLen}$ is the length of the preamble, $l^{s,m} = N_{LVC} + s + (m+l-1)*3$, $N_{LVC}$ is the number of the left virtual subcarriers, $n(l^{s,m})$ is a Gauss white noise in the subcarrier.

7. The apparatus for preamble detection and integer carrier frequency offset estimation in claim 1, wherein the cell and integer carrier frequency offset selector comprises:
   a threshold comparator for comparing, for a plurality of frames, each correlation value outputted by the cross correlator with a multiplication between a pre-selected threshold and the sum of all correlation values;
   a counter, which is counted for a frame when there are correlation values greater than the multiplication in the frame;
   a group of delay registers for storing, when there are correlation values greater than the multiplication, the correlation values greater than the multiplication and preamble indices, shift indices and group indices thereof;

a correlation value averager for averaging, when a count value of the counter reaches a predetermined value, the stored correlation values with same preamble index, shift index and group index;

a maximum selector for selecting the preamble index, shift index and group index corresponding to a maximum average correlation value; and a cell ID and integer carrier frequency offset mapper for determining a target base station, deriving a target cell ID, and the integer carrier frequency offset between a mobile station and the target base station, based on the selected preamble index, shift index and group index.

8. The apparatus for preamble detection and integer carrier frequency offset estimation in claim 7, wherein the threshold comparator resets the counter to zero, and clears the correlation values stored in the group of delay registers, when all correlation values are less than the multiplication in a frame.

9. The apparatus for preamble detection and integer carrier frequency offset estimation in claim 7, wherein the correlation value averager is enabled when the count value of the counter reaches a predetermined number of frames.

10. The apparatus for preamble detection and integer carrier frequency offset estimation in claim 7, wherein a base station corresponding to the selected preamble index is selected as the target base station.

11. The apparatus for preamble detection and integer carrier frequency offset estimation in claim 7, wherein the integer carrier frequency offset between the mobile station and the target base station is $$\text{Est\_ICFO}=3*m_{shift}+s_{group}-\text{SegNum}$$

wherein $m_{shift}$ is the shift index, $s_{group}$ is the group index, SegNum is a segment number obtained in accordance with IEEE 802.16d/e.

12. An method for preamble detection and integer carrier frequency offset estimation, comprising the steps of:
   determining a window of useful subcarriers in a preamble transformed to the frequency domain based on a predetermined possible integer carrier frequency offset and the length of the preamble, so as to select the useful subcarriers;
   extracting a plurality of subcarrier sequences from the useful subcarriers;
   calculating conjugative multiplications of each subcarrier and its neighboring subcarriers in the plurality of subcarrier sequences extracted;
   acquiring a real part of the conjugative multiplications;
   calculating cross correlations between the real part of the conjugative multiplications and known preambles modulated by a differential phase shift keying modulation scheme, and outputting the calculated correlation values; and
   detecting a preamble index of a target base station with the calculated correlation values, and selecting a target cell, and estimating integer carrier frequency offset with respect to the target base station.

13. The method for preamble detection and integer carrier frequency offset estimation in claim 12, further comprising a step of:
   selecting subcarriers every three tone from the useful subcarriers, and dividing the useful subcarriers into three groups, and
   in extracting the subcarrier sequences, extracting a plurality of subcarrier sequences from each of the groups.

14. The method for preamble detection and integer carrier frequency offset estimation in claim 12, further comprising a step of:
   transforming a received preamble to frequency domain, prior to selecting the useful subcarriers.

15. The method for preamble detection and integer carrier frequency offset estimation in claim 12, further comprising a step of:
   modulating known preambles stored previously by the differential phase modulation shift keying scheme, prior to calculating the cross correlations.

16. The method for preamble detection and integer carrier frequency offset estimation in claim 12, wherein the length of the window of the useful subcarriers is:

$$N_{win}=3N_{CodeLen}+2\text{PICFO}$$

wherein PICFO is the predetermined possible integer carrier frequency offset, $N_{CodeLen}$ is the length of the preamble.

17. The method for preamble detection and integer carrier frequency offset estimation in claim 12, wherein a plurality of subcarrier sequences are extracted by way of shifting, and the number of the subcarrier sequences extracted being the predetermined possible integer carrier frequency offset, and each of the subcarrier sequences having unique group index and shift index, and the subcarriers in each of the subcarrier sequences can be described as:

$$Y(l^{s,m})=H(l^{s,m})X(l^{s,m})+n(l^{s,m})$$

wherein l is a value from 1 to $N_{CodeLen}$, s is a value from 0 to 2, m is a value from −PICFO/3 to +PICFO/3, PICFO is the predetermined possible integer carrier frequency offset, $N_{CodeLen}$ is the length of the preamble, $l^{s,m}=N_{LVC}+s+(m+l-1)*3$, $N_{LVC}$ is the number of the left virtual subcarriers, $n(l^{s,m})$ is a Gauss white noise in the subcarrier.

18. The method for preamble detection and integer carrier frequency offset estimation in claim 12, wherein selecting the target cell and estimating the integer carrier frequency offset comprises the steps of:
   comparing, for a plurality of frames, each correlation value with a multiplication between a pre-selected threshold and the sum of all correlation values;
   counting for a frame when there are correlation values greater than the multiplication in the frame;
   storing, when there are correlation values greater than the multiplication, the correlation values greater than the multiplication and preamble indices, shift indices and group indices thereof;
   averaging, when a count value in counting reaches a predetermined value, the stored correlation values with same preamble index, shift index and group index;
   selecting the preamble index, shift index and group index corresponding to a maximum average correlation value; and
   determining a target base station, deriving a target cell ID, and the integer carrier frequency offset between a mobile station and the target base station, based on the selected preamble index, shift index and group index.

19. The method for preamble detection and integer carrier frequency offset estimation in claim 18, wherein the count value is reset to zero, and the correlation values stored is cleared, when all correlation values are less than the multiplication in a frame.

20. The method for preamble detection and integer carrier frequency offset estimation in claim 18, wherein averaging the stored correlation values with same preamble index, shift index and group index, when the count value reaches a predetermined number of frames.

21. The method for preamble detection and integer carrier frequency offset estimation in claim 18, wherein a base station corresponding to the selected preamble index is selected as the target base station.

22. The method for preamble detection and integer carrier frequency offset estimation in claim 18, wherein the integer carrier frequency offset between the mobile station and the target base station is $$\text{Est\_ICFO} = 3 * m_{shift} + s_{group} - \text{SegNum}$$

wherein $m_{shift}$ is the shift index, $s_{group}$ is the group index, SegNum is a segment number obtained in accordance with IEEE 802.16d/e.

* * * * *